(12) United States Patent
Cardoso et al.

(10) Patent No.: US 9,097,614 B2
(45) Date of Patent: Aug. 4, 2015

(54) VEHICLE EMISSIONS TESTING AND TOLL COLLECTION SYSTEM

(75) Inventors: George Cunha Cardoso, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 761 days.

(21) Appl. No.: 13/352,683

(22) Filed: Jan. 18, 2012

(65) Prior Publication Data

US 2013/0185001 A1 Jul. 18, 2013

(51) Int. Cl.
  *G01M 15/10* (2006.01)
  *G01M 17/007* (2006.01)

(52) U.S. Cl.
  CPC ........... *G01M 15/102* (2013.01); *G01M 17/007* (2013.01)

(58) Field of Classification Search
  CPC . G01M 15/102; G01M 15/108; G01M 15/10; G01M 15/104; G01M 17/007; G01N 21/3504; G01N 21/33; G07B 15/06; G07B 15/063; G07B 15/00; G06Q 30/0283
  USPC ................... 702/22–24, 26; 73/23.32, 23.33; 250/338.5
  See application file for complete search history.

(56) References Cited

U.S. PATENT DOCUMENTS

| | | | |
|---|---|---|---|
| 3,705,976 A | * | 12/1972 | Platzman ...................... 235/384 |
| 4,789,939 A | * | 12/1988 | Hamburg ...................... 701/103 |
| 5,210,702 A | | 5/1993 | Bishop et al. |
| 5,319,199 A | | 6/1994 | Stedman et al. |
| 5,371,367 A | | 12/1994 | DiDomenico et al. |
| 5,401,967 A | | 3/1995 | Stedman et al. |
| 5,489,777 A | | 2/1996 | Stedman et al. |
| 5,498,872 A | | 3/1996 | Stedman et al. |
| 6,560,545 B2 | | 5/2003 | Stedman et al. |
| 6,671,630 B2 | | 12/2003 | Stedman et al. |
| 6,701,256 B2 | | 3/2004 | Stedman et al. |
| 7,164,132 B2 | * | 1/2007 | Didomenico et al. ..... 250/338.5 |
| 7,355,714 B2 | | 4/2008 | Wang et al. |

(Continued)

OTHER PUBLICATIONS

W.J. Williams, and D.H. Stedman, G.A. Bishop, J.R. Starkey, A. Ihlenfeldt, "IR Long-Path Photometry, A Remote Sensing Tool for Automobile Emissions", Anal. Chem., 61: 671A-677A, 1989.

(Continued)

*Primary Examiner* — Manuel L Barbee
(74) *Attorney, Agent, or Firm* — Philip E. Blair; Fleit Gibbons Gutman Bongini & Bianco P.L.

(57) ABSTRACT

What is disclosed is a system and method for testing a motorized vehicle's exhaust emissions in a non-controlled emissions testing environment. In one embodiment, the present system comprises a toll collection structure having a sensor for obtaining information about a registered owner of a motor vehicle and about the motor vehicle itself, as the vehicle travels on a lane which passes through the structure. At least one emissions detector, which is fixed to the toll collection structure, performs an emissions test on the vehicle by analyzing an exhaust plume emitted by the vehicle. Speed/acceleration of the vehicle is also measured. In various embodiments hereof, the emissions detector comprises a combination of dispersive or non-dispersive infrared detector and a dispersive or non-dispersive ultraviolet detector. Emissions data collected is automatically compared to emissions standards and an authority is notified if that the vehicle does not meet those standards. Various embodiments are disclosed.

14 Claims, 6 Drawing Sheets

(56) References Cited

U.S. PATENT DOCUMENTS

| | | | |
|---|---|---|---|
| 7,385,704 | B2 | 6/2008 | Mestha et al. |
| 7,417,746 | B2 | 8/2008 | Lin et al. |
| 8,065,181 | B2 | 11/2011 | McNew et al. |
| 2003/0110075 | A1* | 6/2003 | Shioda et al. .......... 705/13 |
| 2007/0263213 | A1 | 11/2007 | Stedman |
| 2007/0276561 | A1 | 11/2007 | Tripathi et al. |
| 2008/0202206 | A1 | 8/2008 | Nelson et al. |
| 2009/0272181 | A1 | 11/2009 | Stedman |
| 2010/0161391 | A1* | 6/2010 | Ashby et al. .......... 705/13 |
| 2011/0153223 | A1 | 6/2011 | Gentala et al. |
| 2011/0162435 | A1 | 7/2011 | Stedman |

OTHER PUBLICATIONS

D.H. Stedman, Automobile Carbon Monoxide Emission, Environ. Sci. & Technol., 23:147-149, 1989.

G.A. Bishop and D.H. Stedman, "Oxygenated Fuels, A Remote Sensing Evaluation", SAE Tech. Paper Series 891116, 1989.

D.H. Stedman and G.A. Bishop, Evaluation of a Remote Sensor for Mobile Source CO Emissions, EPA Publication 600/4-90/032, 1990.

D.H. Stedman and G.A. Bishop, An Analysis of On-Road Remote Sensing As a Tool for Automobile Emissions Control, Final Report to the Illinois Department of Energy and Natural Resources, ILENR/RE-AQ-90/05, 1990.

P.L. Guenther, D.H. Stedman, G.A. Bishop, J.W. Hannigan, J.H. Bean and R.W. Quine, Remote Sensing of Automobile Exhaust, Final Report to the American Petroleum Institute, Publication No. 4538, 1991.

G.A. Bishop, N.E. Holubowitch and D.H. Stedman,Remote measurements of on-road emissions from heavy duty diesel vehicles in California; Year 1, 2008, Final Report prepared for NREL, Oct. 2009.

C.E. Lyons, D.H. Stedman, Remote Sensing Enhanced Motor Vehicle Emissions Control for Pollution Reduction in the Chicago Metropolitan Area: Siting and Issue Analysis, Final Report to Illinois Department of Energy and Natural Resources, ILENR/RE-AQ-91/15, 1991.

D.H. Stedman and J.E. Peterson, "Find and Fix the Polluters", Chemtech., 22:47-53, 1992.

D.H. Stedman, G.A. Bishop, P.L. Guenther, J.E. Peterson, S.P. Beaton and I.F. Mc Vey, "Remote Sensing of On-Road Vehicle Emissions", Final Report to Coordinating Research Council under Contract No. VE-8-1, 1992.

G.A. Bishop and D.H. Stedman and T.Jessop, Infrared Emission and Remote Sensing, J. Air Waste Manage. Assoc., 42:695-697, 1992.

L.L. Ashbaugh, D.R. Lawson, G.A. Bishop, P.L. Guenther, and D.H. Stedman, R.D. Stephens, P.J. Groblicki, J.S. Parikh, B.J. Johnson, and S.C. Huang, On-Road Remote Sensing of Carbon Monoxide and Hydrocarbon Emissions During Several Vehicle Operating Conditions, Presented at AWMA/EPA Conference on PM10 Standards and Nontraditional Particulate Source Controls, Phoenix, AZ, Jan. 1992.

G.A. Bishop, D.H. Stedman, J.E. Peterson, T.J. Hosick and P.L. Guenther, "A Cost-Effectiveness Study of Carbon Monoxide Emissions Reduction Utilizing Remote Sensing", J. Air Waste Manage. Assoc., 43:978-988, 1993.

D.H. Stedman, G.A. Bishop, Y. Zhang and P. L. Guenther, "Remote Sensing of Automobile Emissions", Traffic Technology International 94, 194-198, UK & International Press, 1994.

P.L. Guenther, D.H. Stedman, G.A. Bishop, S.P. Beaton, J.H. Bean and R.W. Quine, "Hydrodocarbon Detector for the Remote Sensing of Vehicle Exhaust Emissions", Rev. Sci. Instrum., 66:3024-3029, 1995.

Y. Zhang, D.H. Stedman, G.A. Bishop, P.L. Guenther and S.P. Beaton, "Worldwide On-Road Vehicle Exhaust Emissions Study by Remote Sensing", Environ. Sci.Technol., 29:2286-2294, 1995.

D.H. H Stedman and G.A. Bishop, "Remote Sensing: A Simpler Way to Reduce Air Pollution", The Commonwealth Foundation, Issue Brief, Sep. 1995.

Y. Zhang, D.H. Stedman, G.A. Bishop, S.P. Beaton, P.L. Guenther and I.F. Mc Vey, "Enhancement of Remote Sensing for Mobile Source Nitric Oxide", J. Air Waste Manage. Assoc., 46:25-29, 1996.

D.H. Stedman and G.A. Bishop, "Measuring the Emissions of Passing Cars", Acc. Chem. Res., 29:489-495, 1996.

P.A. A Walsh, J.C. Sagebiel, D.R. Lawson, K.T. Knapp, G.A. Bishop, "Comparison of Auto Emission Measurement Techniques", Sci. Tot. Environ., 189/190:175-180, 1996.

D.H. Stedman, G.A. Bishop, P. Aldrete, R.S. Slott, "On-Road Evaluation of an Automobile Emission Test Program", Environ. Sci. Technol., 31:927-931, 1997.

P. Popp, G.A. Bishop and D.H. Stedman, "Development of a High-Speed Ultraviolet Spectrophotometer, Capable of Real-Time NO and Aromatic Hydrocarbon Detection in Vehicle Exhaust", Proc. of CRC 7th On-Road Vehicle Emissions Workshop, San Diego, CA, Apr. 10, 1997.

D.H. Stedman, G.A. Bishop and P. Aldrete, "On-Road CO, HC, NO and Opacity Measurements", Proc. of CRC 7th On-Road Vehicle Emissions Workshop, San Diego, CA, Apr. 11, 1997.

G.A. Bishop, D.H. Stedman and R.B. Hutton, "Final Technical Report for ITS for Voluntary Emission Reduction: An ITS Operational Test Using Real-Time Vehicle Emissions Detection", Final Report to CDOT, May 1998.

G.A. Bishop and D.H. Stedman, "Automobile Emissions On-Road", John Wiley & Sons, Inc., New York, Ed. Robert a. Meyers, The Encyl. of Environ. Analysis and Remediation, 1:542-555, Mar. 1998.

P.J. Popp and D.H. Stedman, "Remote Sensing of Commercial Aircraft Emissions", Final Report, 1998.

P.J. Popp, G.A. Bishop and D.H. Stedman, "A Method for Commercial Aircraft NOx Emission Measurements", Environ. Sci. Technol., 33:1542-1544, 1999.

P.J. Popp, G.A. Bishop and D.H. Stedman, "Development of a High-Speed Ultraviolet Spectrometer for Remote Sensing of Mobile Source Nitric Oxide Emissions", J. Air Waste Manage. Assoc., 49:1463-1468, 1999.

P.J. Popp, G.A. Bishop and D.H. Stedman, "Remote Sensing of Railroad Locomotive Emissions: A Feasibility . Study", Final Report prepared for FHA, Feb. 12, 1999.

D.H. Stedman, "Identification of Polluting Vehicles by Remote Sensing", N.C.S.L., Ground Transportation for the 21st Century, F. Kreith et al, Appendix D:162-164, 1999.

G.A. Bishop, D.H. Stedman, R.B. Hutton, L. Bohren and N. Lacey, "Drive-by Motor Vehicle Emissions: Immediate Feedback in Reducing Air Pollution", Environ. Sci. Technol., 34:1110-1116, 2000.

K.S. Bradley, K. Brooks, L. Hubbard, P.J. Popp and D.H. Stedman, "Motor Vehicle Fleet Emissions by OP-FTIR", Environ. Sci. Technol., 34:897-899, 2000.

S.S. Pokharel, G.A. Bishop and D.H. Stedman, "Fuel-Based On-Road Motor Vehicle Emissions Inventory for the Denver Metropolitan Area", presented at the International Emission Inventory Conference, Denver, CO. May 2001.

S.S. S Pokharel, G.A. Bishop and D.H. Stedman, "Preliminary Studies Using Remote Sensing to Evaluate I/M Effectiveness", Final Report to U.S. EPA, Aug. 2001.

D.H. Stedman and G.A. Bishop, "Opacity Enhancement of the On-Road Remote Sensor for HC, CO and NO", Final Report prepared for CRC-E56-2, Feb. 2002.

D.H. Stedman and G.A. Bishop, "On-Road Emissions Measured by Remote Sensing", Int. Powertrain Rev., Apr. 4-5, 2005.

G.A. Bishop, D.A. Burgard, T.R. Dalton and D.H. Stedman, "In-use Emission Measurements of Snowmobiles and Snowcoaches in Yellowstone National Park", Final Report prepared for the National Park Service, Jan. 2006.

D.A. Burgard, G.A. Bishop, R.S. Stadtmuller, T.R. Dalton and D.H. Stedman, "Spectroscopy Applied to On-Road Mobile Source Emissions", Appl. Spectrosc., 60:5:135A-148A, 2006.

D.A. Burgard, G.A. Bishop, D.H. Stedman, V.H. Gessner and C. Daeschlein, "Remote Sensing of In-Use Heavy-duty Diesel Trucks", Environ. Sci. Technol., 40:6938-6942, 2006.

(56) References Cited

OTHER PUBLICATIONS

G.A. Bishop, R. Stadtmuller, D.H. Stedman and J.D. Ray, "Portable Emission Measurements of Snowcoaches and Snowmobiles in Yellowstone National Park", Final Report prepared for the National Park Service, Jan. 2007.

Cardoso et al., "Vehicle Emissions Testing and Toll Collection System", U.S. Appl. No. 13/352,683, filed Jan. 18, 2012.

Cardoso et al., "Minimally Invasive Image-Based Determination of Carbon Dioxide ($CO_2$) Concentration in Exhaled Breath", U.S. Appl. No. 13/246,560, filed Sep. 27, 2011.

Marco F. Duarte et al., "Single-Pixle Imaging via Compressive Sampling", IEEE Signal Processing Magazine, pp. 83-91, (Mar. 2008).

* cited by examiner (FRONT)

US 9,097,614 B2

VEHICLE EMISSIONS TESTING AND TOLL COLLECTION SYSTEM

TECHNICAL FIELD

The present invention is directed to systems and methods which combine the testing of a motor vehicle for exhaust emissions during toll fee collection.

BACKGROUND

A typical Electronic Toll Collection (ETC) system electronically charges motorists a tolling fee for using certain roads or High Occupancy Toll (HOT) lanes, without having them physically stop at a toll booth to pay. Such systems are widespread. ETC systems typically detect some tag identification using a sensor as the vehicle passes through an ETC equipped toll booth. Most government agencies require that a motor vehicle be regularly tested to determine whether the vehicle meets emissions standards set for this vehicle, as pollution caused by vehicle exhaust is an environmental concern. Making emissions testing convenient to the motoring public is a desirable objective.

Accordingly, what is needed in this art is a toll collection system which marries the technology of automatic toll collection with testing of vehicle exhaust emissions.

BRIEF SUMMARY

What is disclosed is a system and method for testing a motorized vehicle's exhaust emissions in a non-controlled environment such as during toll collection. The present system comprises a toll collection system having an RFID sensor which wirelessly communicates with an electronic tag fixed to a windshield of the vehicle, and further has at least one emissions detector for analyzing an exhaust plume of the vehicle for carbon monoxide (CO), carbon dioxide ($CO_2$), hydrocarbons (HC), and/or ($NO_x$). As the vehicle passes through the toll collection structure, the sensor queries the vehicle's electronic tag for information about the vehicle such as, for instance, the year/make/model of the vehicle and the registered owner of the vehicle. A database of motor vehicle records is automatically queried to determine whether this vehicle requires emissions testing. If so, then a signal is initiated which causes the detectors to capture an image of the exhaust plume of the vehicle as the vehicle travels through the toll collection structure. The image of the exhaust plume is analyzed and emissions data is determined for this vehicle. The emissions data is then compared to one or more emissions standards set for the vehicle. A motor vehicle agency or emissions enforcement authority is notified if it is determined, as a result of the emissions test, that the vehicle does not meet those standards.

Features and advantages of the teachings hereof will become readily apparent from the following detailed description and accompanying drawings.

DETAILED DESCRIPTION

What is disclosed is a system and method for testing a motorized vehicle's exhaust emissions during toll collection.

Non-Limiting Definitions

A "motor vehicle" refers to a motorized vehicle, as is known in the automotive arts, with an internal combustion engine which burns a fuel such as, for instance, gasoline/petrol, diesel, natural gas, methane, nitro-methane, fuel oil, or bio-fuels, including any fuel additives.

Figure 1:
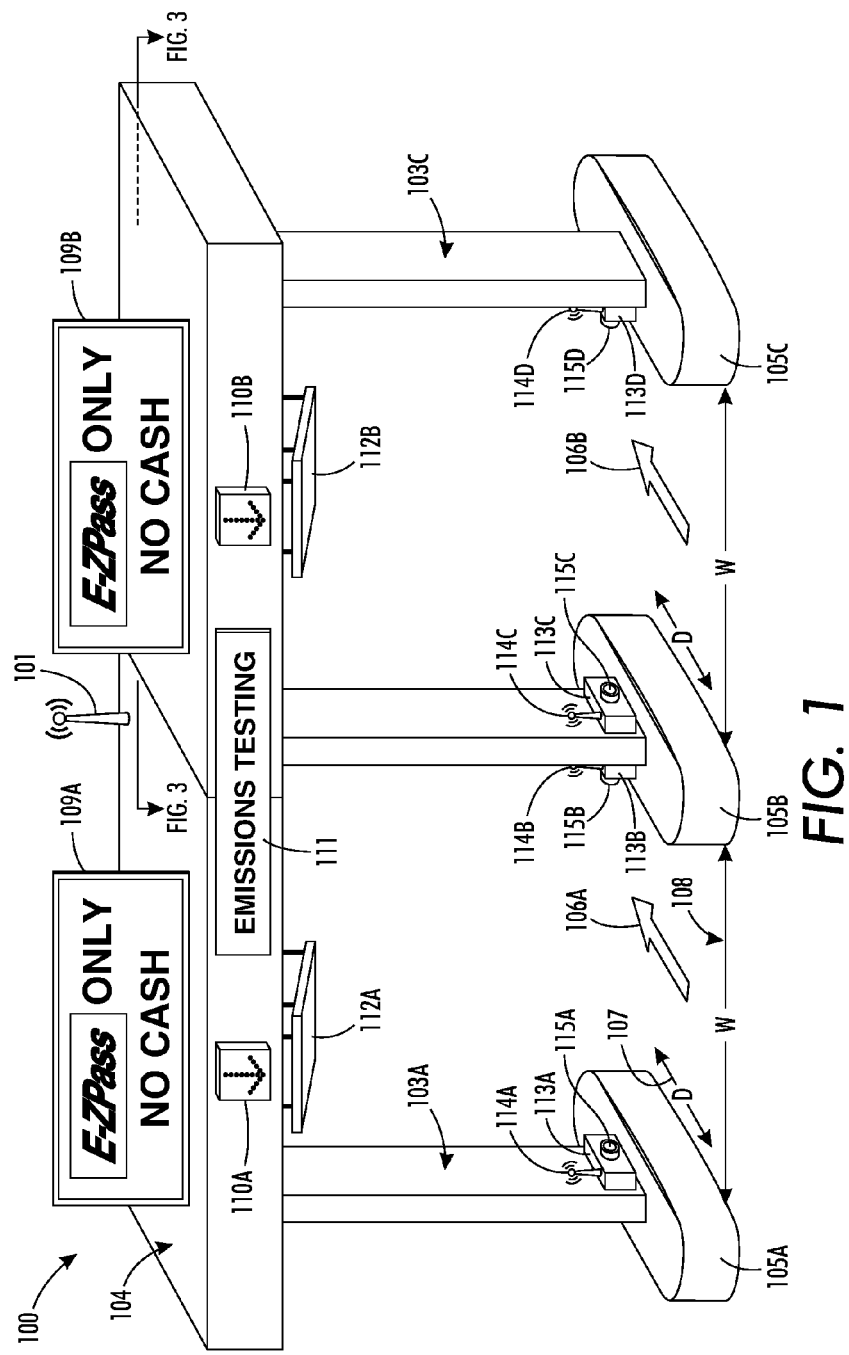
FIG. 1 illustrates one example embodiment of a toll collection system in accordance with the teachings hereof.

A "toll collection structure", often called an Electronic Toll Collection (ETC) System, is a structure positioned on or above a toll road whereby money is collected from motorists who make use of that road. Active toll structures have toll booths with toll gates which cause the motorist to stop their vehicle and physically make a payment by either handing money to a toll clerk or providing coins to a coin collection system so that the gate is raised and they can continue. Passive toll structures do not have booths with gates but, instead, have one or more radio frequency identification devices (RFID sensors) which electronically charge a fee for using that road or for using a High Occupancy Toll (HOT) lane during particular hours of the day. Passive toll structures do not require that the motorist physically stop their vehicle. Such structures are widely used as they do not slow down traffic and result in less accidents. One example passive toll collection structure is shown in FIG. 1. Users of such automated toll collection systems open a pre-funded/paid account using a debit or credit card which provides a readily available source of funds from which HOV fees and toll charges can be automatically deducted. Upon opening their account with the ECT system, the motorist is provided with an electronic tag which is associated with them and their account. The electronic tag is fixed to the vehicle's front windshield. Sensors fixed to the toll structure typically utilize radio-frequency identification (RFID) technology. Standards are set for RFID by agencies including: International Organization for Standardization (ISO), the International Electrotechnical Commission (IEC), ASTM International, DASH7 Alliance, and EPCglobal. RFID devices utilize a radio-frequency (RF) transmitter and receiver. As the vehicle comes within a defined proximity to the RIFD sensor, communication is effectuated between the RFID sensor and the vehicle's electronic RFID tag. RFID tags can be read from a distance of several meters and often beyond the line of sight of the RFID reader. RFID sensors are capable of simultaneously discriminating between numerous RFID tags.

Figure 2:
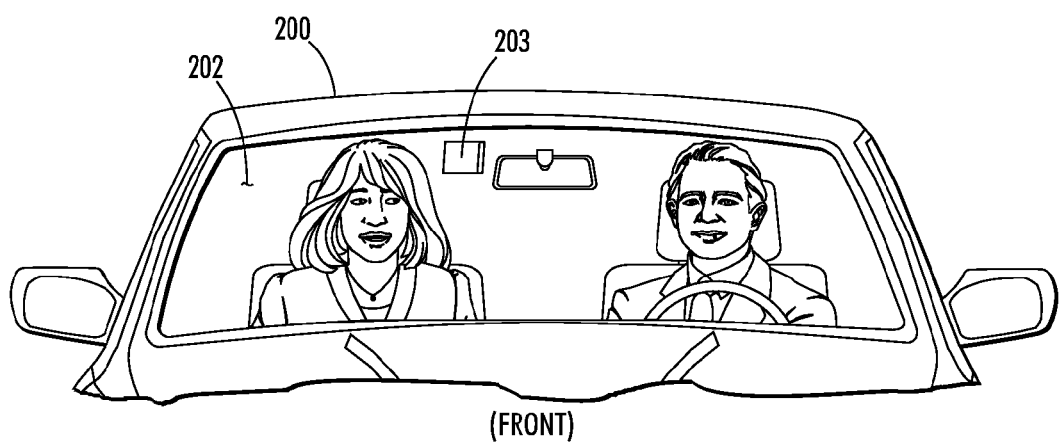
FIG. 2 shows a frontal view of a motor vehicle with an electronic tag affixed to the vehicle's front windshield.

An "electronic tag" is a small integrated circuit capable of modulating and demodulating a signal and engaging in bi-directional communication with a similarly configured device. Electronic tags further have specialized onboard components for processing and storing data. In one embodiment, the electronic tag is a RFID tag capable of modulating/demodulating a radio frequency (RF) signal. An RFID tag receives a RF signal from an RFID sensor and then responds accordingly. Passive RFID tags do not use a battery but instead utilize the RF energy transmitted by the RFID sensor as an energy source. Active RFID tags have a small on-board battery and its circuitry is turned ON or activated in response to having received a RF signal. Example electronic tags are New York's E-ZPass, Florida's SunPass, California's Fas-Trak, and Texas' EZ-Tag. RFID-enabled toll collection systems and RFID tags are used throughout the world. One example electronic tag 203 is shown in FIG. 2 fixed to the front windshield 202 of motor vehicle 200. In accordance herewith, in response to having received a RF signal from a RFID sensor, the RFID tag communicates information about the vehicle. The vehicle's electronic tag may be updated with new or additional information as needed. Such an update may occur manually or automatically via the RFID sensor or another device. Alternatively, instead of a RFID sensor the toll system can read the license plate of the vehicle using cameras in order to identify the vehicle.

"Information about the vehicle", is intended to be broadly construed to include any information communicated between the vehicle's electronic RFID tag and toll structure's RFID sensor. Information about the motor vehicle includes the vehicle's registration information such as plate number and year/make/model, and further includes the date of the vehicle's last emissions test, and vehicle owner's contact information such as, for example, the owner's name, address, phone, and email.

Figure 3:
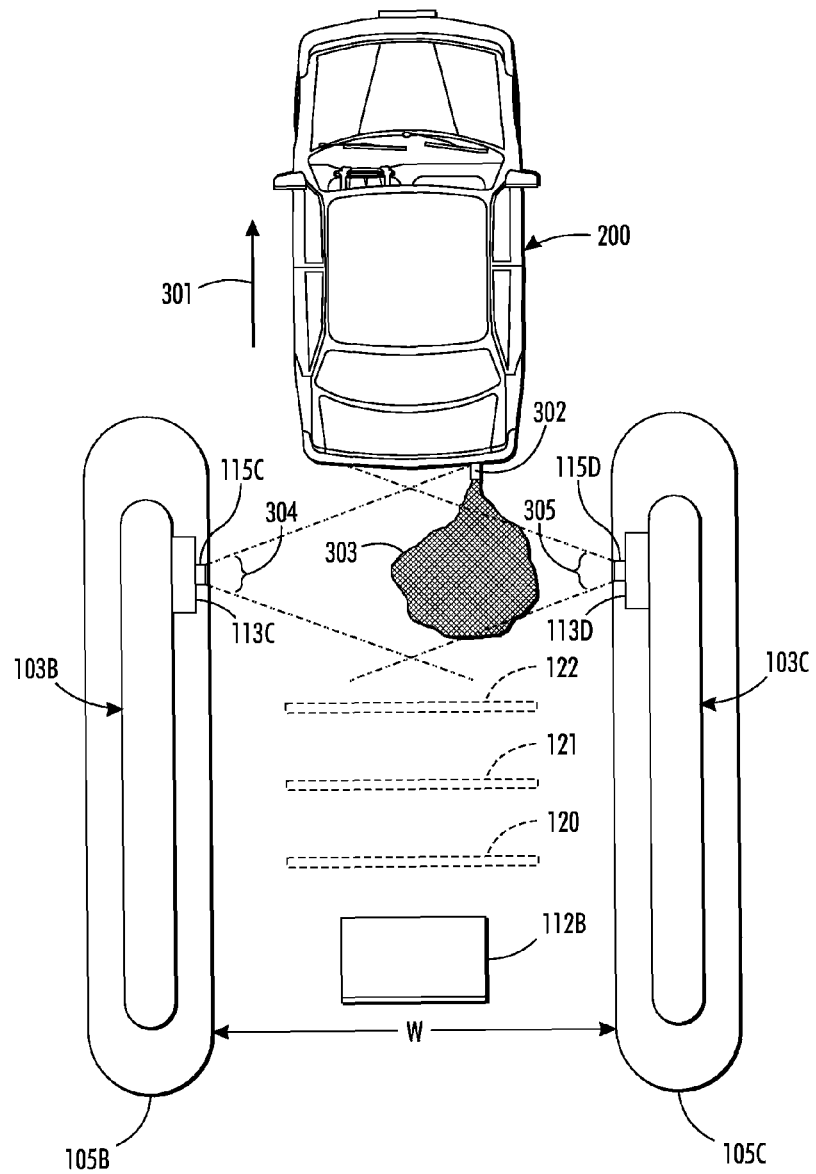
FIG. 3 illustrates a top-side cutaway view of the vehicle of FIG. 2 passing through a lane of the toll collection structure of FIG. 1.

An "emissions detector" is one or more high-speed cameras with or without illuminators depending on the wavelength chosen which is capable of capturing an image of the exhaust plume of a motor vehicle as the motor vehicle passes in front of the camera's field of view. Example emissions detectors are shown in the embodiments of FIGS. 1 and 3. The emissions detector can be a non-dispersive infrared camera. One example of a mid-wave infrared camera system would use the Mercury Cadmium Telluride (HgCdTe) detector array with detection range capabilities from 3.7 um to 4.8 um. Cameras with Mercury Cadmium Telluride detectors also are being developed by the same company for a range between 0.8 um to 2.5 um. Indium antimonide (InSb) detectors are other examples that can operate in the range between 3.6 um to 4.9 um, with sensitivity available as low as 1 um wavelength. Such devices have the capability to simultaneously deliver a digital output and an analog video output for display on a monitor device. Such detection devices are readily available from various streams of commerce. For instance, the Onca-MWIR-MCT-640 and Onca-MWIR-InSb-640 cameras are available from Xenics. The SC8000 available from FLIR uses a highly sensitive cooled InSb detectors. The cameras or light detectors can be fitted with spectral filters or filter wheels with transmission bands corresponding to the signature emission or absorption wavelengths of elements or compounds of interest. The single pixel camera may also be used as a detector in accordance with the teachings hereof. One such camera is described in: "*Single-Pixel Imaging Via Compressive Sampling*", Marco F. Duarte et al., IEEE Signal Processing Magazine, pp. 83, (March 2008), which is incorporated herein in its entirety by reference.

An "exhaust plume" refers to a downwind pattern of exhaust gases emitted as a result of the combustion of a vehicle's engine. An example exhaust plume is shown in 305 of FIG. 3.

"Exhaust gases" are by-products of fuel combustion which are discharged into the atmosphere through the vehicle's exhaust system. Example exhaust gases are carbon monoxide (CO), carbon dioxide ($CO_2$), various hydrocarbon mixes ($C_xH_y$) (simply referred to as HC), nitrogen ($N_2$), nitrogen oxides ($NO_x$), ozone ($O_3$), and particulate matter (called soot).

"Emissions data" refers to the determined concentrations of any of the exhaust gases. Processing emissions data may involve normalizing data such that an error is reduced. It may further include a statistical analysis on the data. A statistical analysis may also be performed on any of the information about the vehicle such as vehicle age, and the like.

"Emissions testing" refers to capturing one or more images of a vehicle's exhaust plume, analyzing those images to produce emissions data for the vehicle being examined, and then comparing the emissions data to one or more standards which have been set by an emissions testing authority. A result of the comparison is used herein to determine whether the vehicle meets those standards.

An "emissions enforcement authority" is an authority such as, for example, a Department of Motor Vehicle authority or law enforcement agency, tasked with checking motor vehicles for compliance with mandated exhaust gas emissions standards. Vehicles may be tested according to a predefined schedule such as, annually, for example. In accordance with the teachings hereof, if a motor vehicle does not meet the exhaust emissions standards set for this vehicle then such an authority can, for example, issue a citation to a registered owner of the vehicle; adjust an amount of a toll charge to the registered owner based upon a result of the test performed on the vehicle; deduct a cost of the emissions testing from an account associated with the vehicle's electronic tag, or invoice the registered owner of the vehicle for the emissions testing; and/or simply notifying the vehicle's registered owner of the test results.

Example Toll Collection System

Reference is now being made to FIG. 1 which illustrates one example embodiment of a toll collection system 100 in accordance with the teachings hereof.

Toll collection system 100 is shown comprising a toll collection structure 102 having support walls 103A-C and a roof 104 which is shown having a Tx/Rx antenna for wireless communication with a workstation (not shown). Concrete walls 103A-C are protected by crash buttresses 105A-C, respectively, which protect the toll collection structure from vehicles. Walls 103A-C collectively provide two separate lanes 106A and 106B for motor vehicles to pass through in a direction shown by each lane's respective directional arrow. Each lane of structure 102 defines a passageway having a depth D (at 107) and a width W (at 108). Fixed to the roof 104 of the toll collection structure are illuminated signs 109A and 109B which, in this illustration, show that each of lanes 106A and 106B accept EZ-PASS tags but do not accept cash. Also above the entrance of each of the lanes of structure 102 are lighted indicators 110A and 110B which, when illuminated, provide notification to the motorist that the respective lane is open for use. Such signs are generally indicated with a green lighted arrow when the lane is open for use and a red lighted arrow when the lane is not open for use. Also positioned to the face of structure 102 is sign 111 which, when illuminated indicates that each of the respective lanes are performing emissions testing on the motor vehicles which pass therethrough. RFID sensors 112A and 112B are shown positioned above lanes 106A-B, respectively, to query a vehicle's electronic RFID tag. In accordance with the teachings hereof, each of the respective lanes 106A and 106B has a set of emissions detectors 113A-D for capturing an image of the exhaust plume emitted from an exhaust pipe of the vehicle as it passes through the structure. First lane 106A has emissions detectors 113A and 113B, and second lane 106B has emissions detectors 113C and 113-D. Detectors on each lane are shown having a respective sensor 115A-D for capturing an image (or video sequence) of the exhaust plume. In another embodiment, sensing units 115A-D sample the vehicle's exhaust plume through openings which physically capture the vehicle's exhaust gases for analysis. Shown attached to each of the emissions detectors 113A-D are antennas 114A-D for bi-directional communication with a computing workstation (not shown).

It should be appreciated that each of detectors 113A-B and 113C-D may be different from each other and thus their respective sensing units 115A-B and 115C-D sample the exhaust plumes differently. Detection system could work based on reflective mode or on transmission mode with various possible illuminator/camera configurations. In one embodiment, fluorescence of the vapors is detected by positioning the camera and illumination sources on the same side. In this mode we would use reflective signals or radiated signals from the vapors of interest. A second solution would be the measurement of the absorption of the vapor through single or double passage of a beam of light through the vehicle vapor cloud. In this configuration we measure the transmitted light through the vapors of interest with an illumination source on one side and the camera detector on the other. Yet another configuration would involve transmission of light through the vapor cloud by imaging on to a mirror to project the transmitted light conveniently from the mirror on to the camera detector. The mirror could potentially get dirty and may need a self cleaning mechanism such as a windshield wiper or equivalent. Moreover, vehicles of certain engine types may be directed to pass through one particular lane such that a desired form of emissions detection is conducted on that vehicle. For instance, vehicles with diesel engines may be directed to pass through one lane while vehicles with gasoline engines are directed to pass through another lane. Vehicles with bio-fuels, for example, may be directed to pass through yet another lane.

Reference is now being made to FIG. 3 which illustrates a top-side cutaway view one of the lanes of the toll collection structure of FIG. 1.

Vehicle 200 of FIG. 2, traveling in the direction indicated by arrow 301, is shown having passed almost entirely through toll collection structure 102 along emissions testing lane 106B. Upon entering the structure, RFID sensor 112B signals RFID tag 203 which, in turn, responds with information about the vehicle including the date of the vehicle's last emissions test. Such information about vehicle 200 had been preloaded onto the tag 203 or provided to the vehicle's electronic tag by way of a periodic update as a result of this vehicle having previously passed through a similarly configured toll collection system. RFID sensor 112B further receives information about the speed of the vehicle from underground speed detectors 120, 121 and 122 which use factors such as time and distance to determine a vehicle's speed and acceleration as the vehicle trips each speed detector device. It should be appreciated that other methods of determining a vehicle's speed can be employed. For example, the vehicle's RFID tag may be placed in communication with the vehicle's speedometer or with one or more transmission components which provide the tag with the speed for the vehicle. That speed data is then communicated by the RFID tag to the RFID sensor as part of the tag's response. In such an embodiment, speed/acceleration detectors won't be needed. In another example, an accelerometer can be incorporated to the RFID tag system and the vehicle's speed/acceleration can be transmitted wirelessly to the toll lane structure.

In response to the vehicle requiring an emissions test, a signal is sent to emissions detectors 113C-D to capture one or more images of the vehicle's exhaust gases at a pre-calculated instance depending on the speed of the vehicle. High speed infrared camera 113C with suitable configurations with and without illuminators and mirrors, and with or without spectrometer 113D simultaneously capture images of the exhaust plume 303 emitted out the vehicle's exhaust pipe 302 as the exhaust plume passes through each detector's respective field-of-view, 304 and 305. The captured images are analyzed for concentration levels of exhaust gases. A result of the analysis is, in turn, used to determine whether the vehicle meets an emissions standard set for the vehicle.

Flow Diagram of One Embodiment

Figure 4:
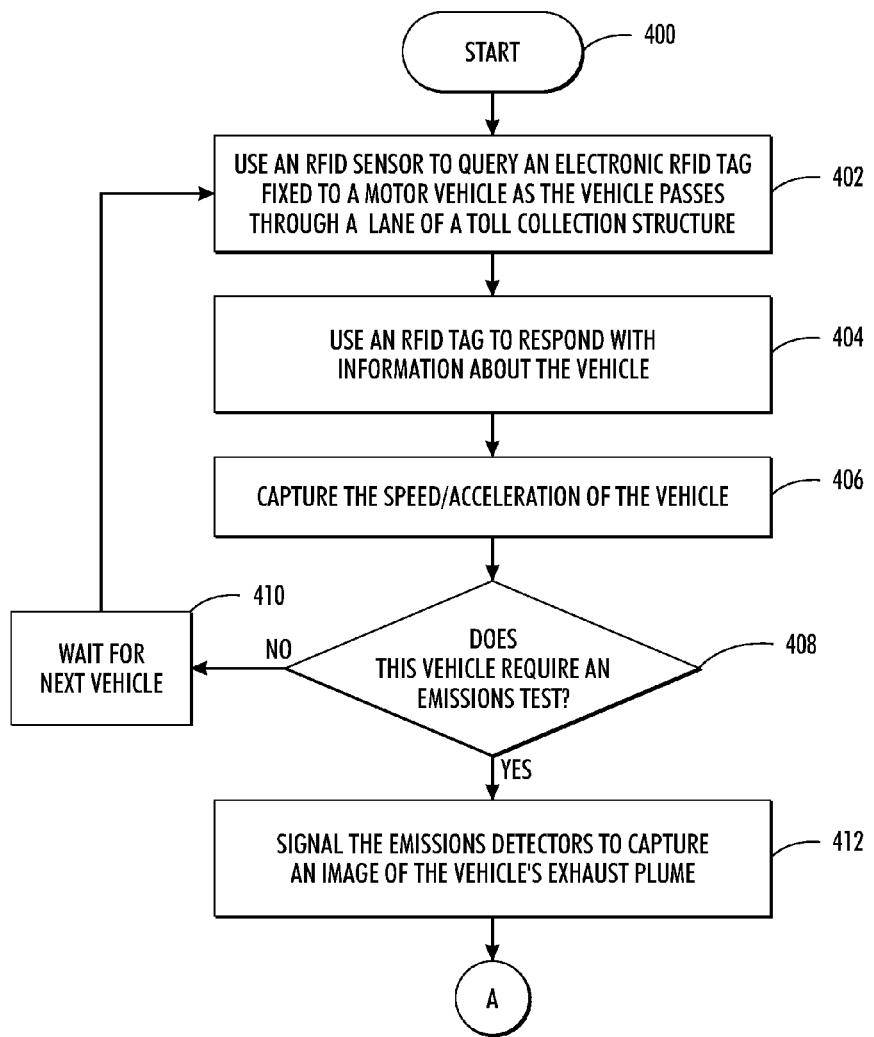
FIG. 4 is a flow diagram which illustrates one example embodiment of the present system and method for testing a motorized vehicle's exhaust emissions during toll collection.

Reference is now being made to the flow diagram of FIG. 4 which illustrates one example embodiment of the present system and method for testing a motorized vehicle's exhaust emissions during toll collection. Flow begins at step 400 and processing immediately proceeds to step 402.

At step 402, an RFID sensor is used to query an electronic tag fixed to a motor vehicle as the vehicle passes through a lane of the toll collection structure. One example toll collection structure is shown and discussed with respect to FIG. 1 and one example electronic tag is shown at 203 having been placed on the windshield 202 of vehicle 200 of FIG. 2.

At step 404, the vehicle's RFID tag responds with information about the vehicle. In one embodiment, information provided by the electronic tag in response to the sensors query includes the vehicle's license plate number, the vehicle's year/make/model, the vehicle's registration information, a date of the vehicle's last emissions test, and the vehicle owner's name and address. In another embodiment, the electronic tag responds with an account identification which, in turn, is used to access records of information about the vehicle from a database. Such records can be provided either directly or indirectly from the Department of Motor Vehicles which gathers, collates, and retains such information.

At step 406, the vehicle's speed/acceleration is captured or otherwise acquired. In one embodiment, speed/acceleration detectors comprise a plurality of underground sensors which are tripped or activated by the passing of the vehicle on the roadway above. Examples of such detectors are shown at 120, 121 and 122 of FIG. 3. In another embodiment, the vehicle's speed/acceleration is provided by the vehicle's RFID tag which has been placed in communication with various speed/acceleration sensors onboard the motor vehicle such as one or more accelerometers and the vehicle's speedometer.

At step 408, a determination is made whether the vehicle requires an emissions test. Such a determination is based, at least in part, upon the response by the vehicle's RFID tag as to whether the vehicle has a current emissions test. If the vehicle does not require emissions testing then, at step 410, the method awaits for sensors to indicate the arrival of a next vehicle. Upon arrival of the next vehicle, processing continues with respect to step 402 wherein the RFID sensor queries the next vehicle's RFID tag. If, on the other hand, this vehicle requires an emissions test then, at step 412, a signal is sent to the emissions detectors to capture an image of the exhaust plume emitted from an exhaust pipe of the vehicle. Example emissions detectors are shown and discussed with respect to the embodiments of FIGS. 1 and 3 wherein a non-dispersive infrared detector 113C is used for detecting carbon monoxide (CO), carbon dioxide ($CO_2$) and various hydrocarbons (HC) and a spectrometer 113D is used for measuring nitric oxide (NO).

Figure 5:
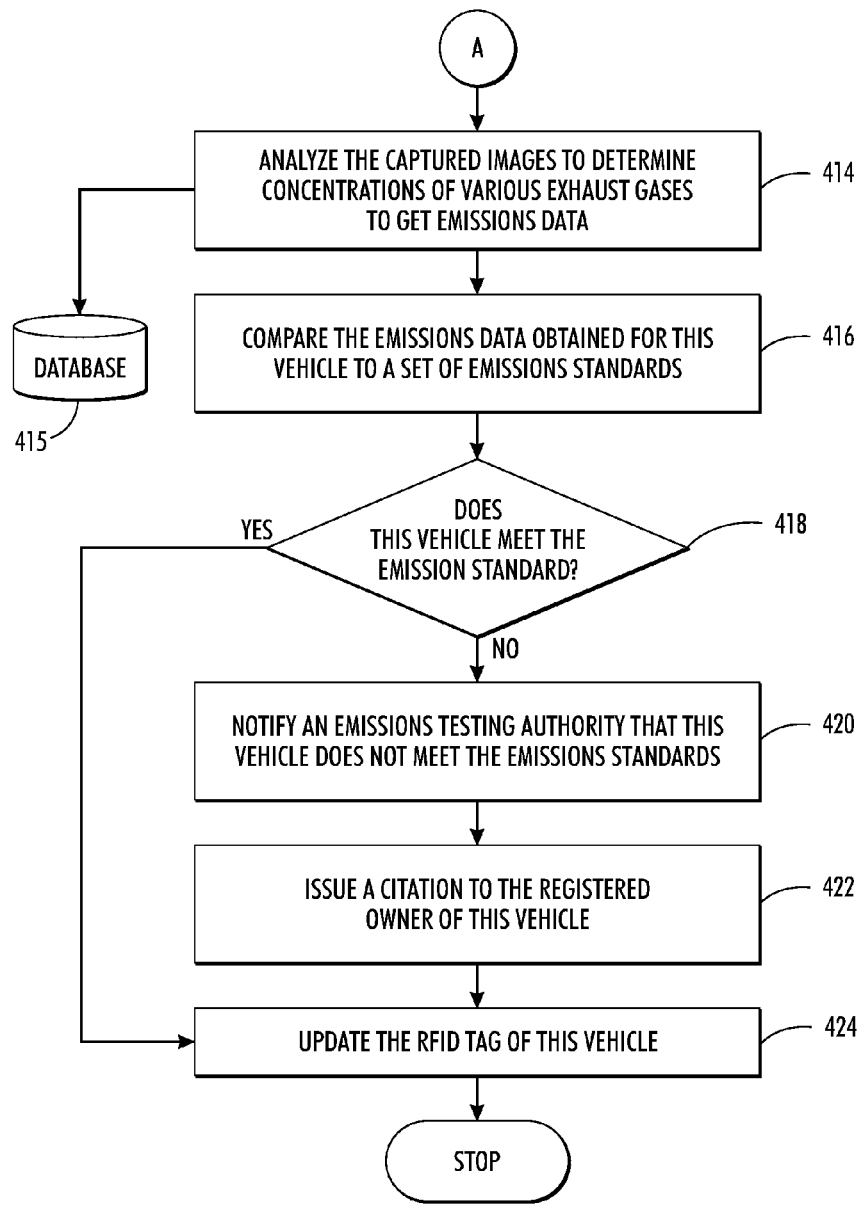
FIG. 5 is a continuation of the flow diagram of FIG. 4 with flow processing continuing with respect to node A.

Reference is now being made to the flow diagram of FIG. 5 which is a continuation of the flow diagram of FIG. 4 with flow processing continuing with respect to node A.

At step 414, the captured images are analyzed for concentrations of various exhaust gases. Methods for analyzing images for exhaust gas concentrations are well established and will depend to a large extend on the type of emissions detectors employed in a respective toll collection structure. A result of the analysis produces emissions data. The emissions data is stored to database 415.

At step 416, the emissions data is then compared to an emissions standard. The emissions standards may be retrieved from a memory or storage device having been pre-loaded in advance of bringing the toll collection structure online for emissions testing.

At step 418, a determination is made whether the vehicle meets the emissions standards set for this vehicle. If the vehicle does not meet the emissions standards then, at step 420, an authority is notified. At step 422, a citation is issued to the vehicle's registered owner in response to the vehicle not meeting the emissions standards. The cost of the citation issued to the vehicle's registered owner can be scaled according to the emissions test results and, at step 424, the vehicle's RFID tag is updated. If, at step 418, the vehicle meets or exceeds the emissions standards set for this vehicle then, at step 424, the vehicle's RFID tag is updated with the test data, test date, and test results. Thereafter, in this embodiment, flow processing stops. Alternatively, flow processing continues with respect to step 410 wherein the method waits for the arrival of a next vehicle. Upon arrival of the next vehicle, processing repeats in a similar manner.

In other embodiments, a cost of the emissions test is automatically deducted from the user's account associated with that tag. The registered owner of the vehicle may be provided with a notification as to the result of the emissions test. Such a notification can take the form of a text message being sent to a phone number of the owner of record, or a pre-recorded voice, text, or video message can be sent to the owner's email address or phone. A message may be sent to the vehicle's ON-STAR system (where equipped) which proceeds to audibly recite the message to the vehicle's driver. A person may contact the vehicle's owner directly. Such embodiments are intended to be encompassed by the appended claims.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions in communication with various components of a vehicle emissions testing system.

Block Diagram of Example System

Figure 6:
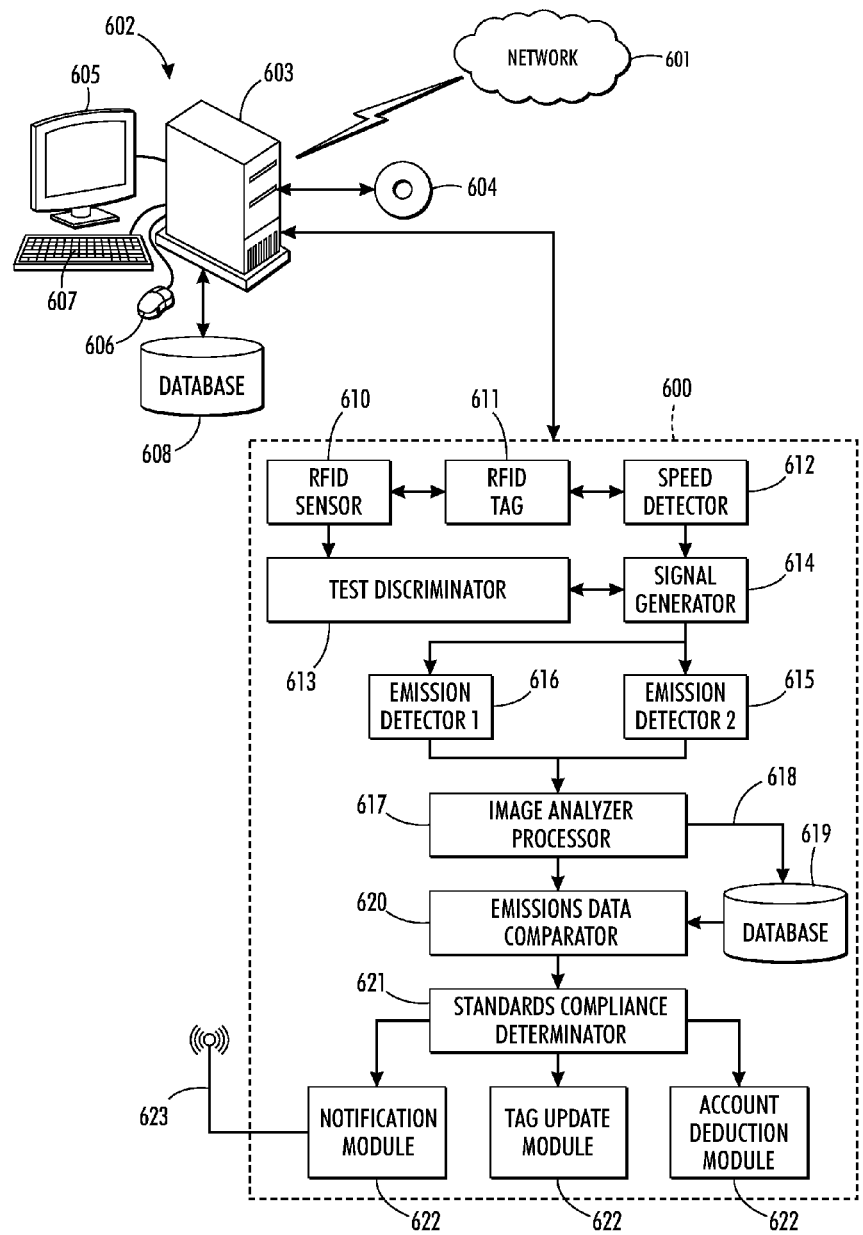
FIG. 6 is a functional block diagram of an example networked system for implementing various aspects of the teachings hereof described with respect to the flow diagrams of FIGS. 4 and 5.

Reference is now being made to FIG. 6 which illustrates a functional block diagram of one embodiment of an example emissions testing system wherein various aspects of the present system and method are performed. The system illustrates a plurality of modules, devices and components in communication with a networked computer workstation 602.

Networked computer workstation 602 includes a hard drive (internal to computer housing 603) which reads/writes to a computer readable media 604 such as a floppy disk, optical disk, CD-ROM, DVD, magnetic tape, etc. Case 603 houses a motherboard with a processor and memory, a communications link such as a network card, graphics card, and the like, and other software and hardware to perform the functionality of a computing device as is generally known in the arts. The workstation includes a graphical user interface which, in various embodiments, comprises display 605 such as a CRT, LCD, touch screen, etc., mouse 606, and keyboard 607. It should be appreciated that workstation 602 has an operating system and other specialized software configured to display a wide variety of numeric values, text, scroll bars, pull-down menus with user selectable options, and the like, for entering, selecting, or modifying information displayed on display 605. The embodiment shown is only illustrative. Although shown as a desktop computer, it should be appreciated that computer 602 can be any of a laptop, mainframe, client/server, or a special purpose computer such as an ASIC, circuit board, dedicated processor, or the like. Any of the Information obtained from any of the modules of system 600 including various characteristics of any of the sensors can be saved to database 608. Information about the document or the sensors may be entered by a user using the graphical user interface of computer 602. Any information may be communicated to a remote device over network 601 for storage or processing. Network 601 is shown as an amorphous cloud. A detailed discussion as to the operation of any specific network or the network configuration has been omitted. Suffice it to say, packets of data are transmitted over the network via special purpose devices in communication with each other via a plurality of communication links. Data is transferred between devices in the network in the form of signals. Such signals may be in any combination of electrical, electromagnetic, optical, or other forms, and are transmitted by wire, cable, fiber optic, phone line, cellular link, RF, satellite, or any other medium or communications link known in the arts.

System 600 is shown comprising an RFID sensor 610, RFID tag 611, and Speed/Acceleration Detection Module 612. As discussed with respect to step 402 of the flow diagram of FIG. 4, RFID sensor 610 queries RFID tag 611. RFID tag responds with information about the vehicle. In this embodiment, Speed/Acceleration Detector Module 612 captures the vehicle's speed/acceleration and provides speed data to RFID tag 611. Test Discriminator Processor 613 determines whether this particular vehicle requires an emissions test. Such a determination is based, at least in part, upon the response by the vehicle's RFID tag as to whether the vehicle has a current emissions test. If this vehicle requires an emissions test then Signal Generator 614 initiates a signal to Emissions Detectors 615 and 616 to capture, at a predetermined moment, one or more images of the exhaust plume emitted from an exhaust pipe of the vehicle. Signal Generator alternatively receives the speed data directly from Speed Detection Module 612. The captured images are provided to Image Analyzer Processor Module 617 which analyzes the images for concentrations of various exhaust gases. A result of the analysis produces emissions data 619 which is stored to storage device 619. Data Comparator 620 receives the emissions data and compares the emissions data to emissions standards which have been retrieved from database 619. Standards Compliance Determinator 621 determines whether the vehicle meets the standard. If the vehicle does not meet the emissions standards then Notification Module 622 proceeds to notify an authority using, for example, Transmission Element 623. Module 622 may further provide a notification of the test results to the vehicle's registered owner, in accordance with various embodiments hereof. Such a notification can take the form of a text message being sent to a phone number of the owner of record, or a pre-recorded voice, text, or video message can be sent to the owner's email address or phone. A message may be sent to the vehicle's ON-STAR system (where equipped) which proceeds to audibly recite the message to the vehicle's driver. Tag Update Module 624 updates the vehicle's RFID tag with the current test data and test results. Account Deduction Module 625 automatically deducts a cost of the emissions test from the user's pre-funded account associated with their RFID tag. Alternatively, the emissions test could be performed for every vehicle passing though the ETC independently of the need to collect data for statistics purpose.

It should be understood that any of the modules and processing units of FIG. 6 are in communication with workstation 602 via pathways (not shown) and may further be in communication with one or more remote devices over network 601. Any of the modules may communicate with storage devices 608 and 619 via pathways shown and not shown and may store/retrieve data, parameter values, functions, records, data, and machine readable/executable program instructions required to perform their intended functions.

Some or all of the functionality for any of the modules of the functional block diagram of FIG. 6 may be performed, in whole or in part, by components internal to workstation 602 or by a special purpose computer system. Various modules may designate one or more components which may, in turn, comprise software and/or hardware designed to perform the intended function. A plurality of modules may collectively perform a single function. Each module may have a specialized processor and memory capable of executing machine readable program instructions. A module may comprise a single piece of hardware such as an ASIC, electronic circuit, or special purpose processor. A plurality of modules may be executed by either a single special purpose computer system or a plurality of special purpose systems operating in parallel. Connections between modules include both physical and logical connections. Modules may further include one or more software/hardware components which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

The teachings hereof can be implemented in hardware or software using any known or later developed systems, structures, devices, and/or software by those skilled in the applicable art without undue experimentation from the functional description provided herein with a general knowledge of the relevant arts. Such a special purpose computer system is capable of executing machine executable program instructions and may comprise a micro-processor, micro-controller, ASIC, electronic circuit, or any combination thereof.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology and functionality described herein. Additionally, the article of manufacture may be included as part of a complete system or provided separately, either alone or as various components.

It will be appreciated that various of the above-disclosed and other features and functions, or alternatives thereof, may be desirably combined into many other different systems or applications. Presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for testing a motorized vehicle's exhaust emissions during toll collection, the method comprising:

using a sensor fixed to a toll collection structure to query an electronic tag fixed to a motor vehicle as said vehicle passes through a lane of said toll collection structure, said tag responding with information about said vehicle and further responding with a date of said vehicle's last emissions test;

determining, based upon said date of said vehicle's last emissions test, whether said vehicle requires an emissions test; and based upon said date of said vehicle's last emissions test, performing emissions testing on said vehicle as said vehicle passes through said toll collection structure, said testing comprising:

using at least one emissions detector fixed to said toll collection structure to capture an image of an exhaust plume emitted by said vehicle;

analyzing said image to determine concentrations of any of: $N_2$, $CO_x$, $NO_x$, $O_3$, $C_xH_y$, and particulate matter, a result of said analysis producing emissions data;

comparing said emissions data to an emissions standard set for said vehicle to determine whether said vehicle meets said standard;

updating said vehicle's electronic tag with a date of said emissions test;

deducting a cost of said emissions test from an account associated with said vehicle's electronic tag;

notifying an authority in response to said vehicle not meeting said standards;

notifying a registered owner of said vehicle of a result of said emissions test;

associating said vehicle's emissions data with information obtained from said vehicle's electronic tag; and storing said vehicle's emissions data to a database.

2. The method of claim 1, wherein said emissions detector comprises any of a combination of dispersive or non-dispersive infrared detector and a dispersive or non-dispersive ultraviolet detector.

3. The method of claim 1, further comprising issuing a citation to a registered owner of said vehicle in response to said vehicle not meeting said standard.

4. The method of claim 3, wherein a cost of said citation is adjusted based upon a result of said vehicle's emissions test.

5. The method of claim 1, wherein information about said motor vehicle includes any of: the vehicle's license plate number, the vehicle's year/make/model, the vehicle's registration information, and the vehicle owner's name and address.

6. The method of claim 1, further comprising normalizing said emissions data such that an error value is reduced.

7. The method of claim 1, further comprising:

storing emissions data for all vehicles passing through said toll collection structure; and performing a statistical analysis on any of: said emissions data and vehicle information.

8. A toll collection system for testing a motorized vehicle's exhaust emissions during toll collection, said system comprising:
- a toll collection structure comprising:
  - a sensor fixed to a toll collection structure which queries an electronic tag fixed to a motor vehicle as said vehicle passes through a lane of said toll collection structure, said tag responding with information about said vehicle and further responding with a date of said vehicle's last emissions test; and
  - at least one emissions detector; and
- a processor in communication with a memory and executing machine readable instructions for performing:
  - determining, based upon said date of said vehicle's last emissions test, whether said vehicle requires an emissions test;
  - based upon said date of said vehicle's last emissions test, performing emissions testing on said vehicle as said vehicle passes through said toll collection structure, said testing comprising:
    - signaling said emissions detector to capture an image of an exhaust plume emitted by said vehicle;
    - analyzing said image to determine concentrations of any of: $N_2$, $CO_x$, $NO_x$, $O_3$, $C_xH_y$, and particulate matter, a result of said analysis producing emissions data;
    - comparing said emissions data to an emissions standard set for said vehicle to determine whether said vehicle meets said standard; and
    - updating said vehicle's electronic tag with a date of said emissions test;
    - deducting a cost of said emissions test from an account associated with said vehicle's electronic tag;
    - notifying an authority in response to said vehicle not meeting said standards;
    - notifying a registered owner of said vehicle of a result of said emissions test;
    - associating said vehicle's emissions data with information obtained from said vehicle's electronic tag; and
    - storing said vehicle's emissions data to a database.

9. The toll collection system of claim 8, wherein said emissions detector comprises any combination of dispersive or non-dispersive infrared detector and a dispersive or non-dispersive ultraviolet detector.

10. The toll collection system of claim 8, further comprising issuing a citation to a registered owner of said vehicle in response to said vehicle not meeting said standard.

11. The toll collection system of claim 10, wherein a cost of said citation is adjusted based upon a result of said vehicle's emissions test.

12. The toll collection system of claim 8, wherein information about said motor vehicle includes any of: the vehicle's license plate number, the vehicle's year/make/model, the vehicle's registration information, and the vehicle owner's name and address.

13. The toll collection system of claim 8, further comprising normalizing said emissions data such that an error value is reduced.

14. The toll collection system of claim 8, further comprising:
- storing emissions data for all vehicles passing through said toll collection structure; and
- performing a statistical analysis on any of: said emissions data and vehicle information.

* * * * *